(12) United States Patent
Angaiah et al.

(10) Patent No.: US 6,623,717 B2
(45) Date of Patent: Sep. 23, 2003

(54) PROCESS FOR THE PREPARATION OF LIBF$_4$

(75) Inventors: Subramanian Angaiah, Tamil Nadu (IN); Vasudevan Thiagarajan, Tamil Nadu (IN); Gangadharan Ramaiyer, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 342 days.

(21) Appl. No.: 09/820,195

(22) Filed: Mar. 28, 2001

(65) Prior Publication Data

US 2002/0172634 A1 Nov. 21, 2002

(51) Int. Cl.$^7$ ................................. C01B 35/06
(52) U.S. Cl. ........................................ 423/276; 423/462
(58) Field of Search .................................. 423/276, 462

(56) References Cited

U.S. PATENT DOCUMENTS

| | | | | | |
|---|---|---|---|---|---|
| 2,738,255 A | * | 3/1956 | Sullivan et al. | ............. | 423/276 |
| 3,119,654 A | * | 1/1964 | Cunningham | ............... | 423/276 |
| 3,178,261 A | * | 4/1965 | Lewis et al. | ................. | 423/276 |
| 6,537,512 B1 | * | 3/2003 | Friedrich et al. | ........... | 423/276 |

* cited by examiner

*Primary Examiner*—Ngoc-Yen Nguyen
(74) *Attorney, Agent, or Firm*—Ladas & Parry

(57) ABSTRACT

The present invention describes a process for the preparation of LiBF$_4$ by reacting LiBO$_2$ with 10 to 48% HF solution in aqueous solution at ambient temperature, concentrating the product and recrystallizing to obtain high purity LiBF$_4$.

4 Claims, 1 Drawing Sheet

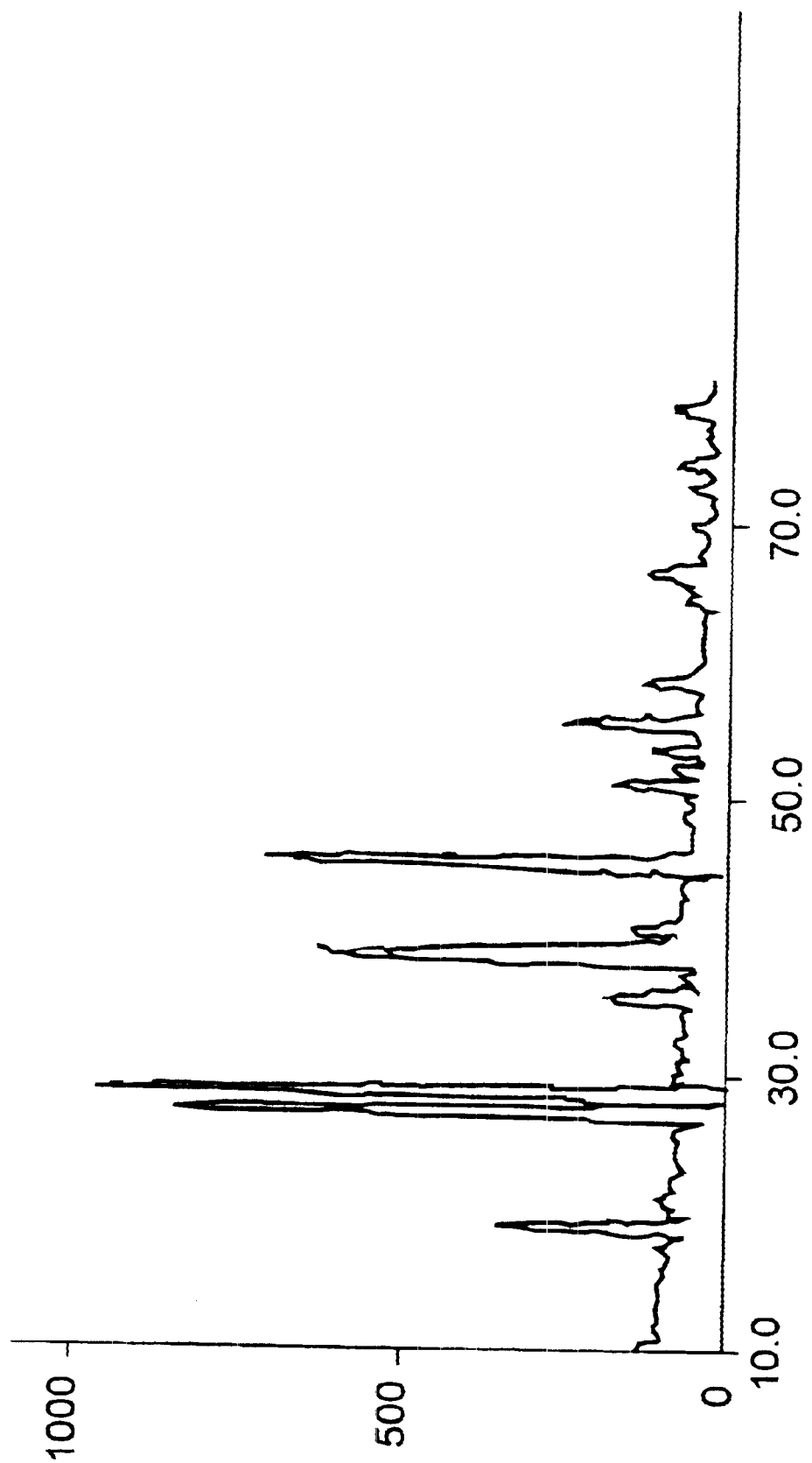
FIG. 1. X-ray diffraction paten of $LiBF_1$

PROCESS FOR THE PREPARATION OF LIBF4

FIELD OF THE INVENTION

The present invention relates to a process for the preparation of $LiBF_4$.

BACKGROUND OF THE INVENTION $LiBF_4$ has very useful applications in high voltage lithium primary/secondary cells. $LiBF_4$ is well known as a battery electrolyte. This compound was earlier prepared by procedures, which were cumbersome and the yield was poor. The purity of the sample prepared was poor and needed recrystallization.

U.S. Pat. No. 5,079,109 discloses the use of $LiBF_4$ as a non-aqueous electrolyte for a lithium battery.

While several methods are known for the preparation of $LiBF_4$ in the prior art such methods suffer from the following disadvantages:

1. The purity of the product is low
2. The yield of the product is low
3. Ambient temperature reaction for the product yield
4. Side reactions occur
5. Multiplicity of steps are required.

OBJECTS OF THE INVENTION

The main object of this invention is to prepare $LiBF_4$ by a simple chemical reaction.

Another object of the invention is to obtain $LiBF_4$ with high yield.

A further object of the invention is to obtain $LiBF_4$ by an efficient process.

The process of the invention overcomes the disadvantages of the prior art enumerated above.

SUMMARY OF THE INVENTION

Accordingly the present invention relates to a process for the preparation of $LiBF_4$ reacting $LiBO_2$ compound with 10 to 48% HF solution in aqueous solution at ambient temperature, concentrating the product and recrystallising to obtain high purity $LiBF_4$.

In one embodiment of the invention, $LiBO_2$ is suspended in aqueous media/nonaqueous media and reacted with HF.

In a further embodiment of the invention, a paste of $LiBO_2$ is added in HF.

In another embodiment of the invention, $LiBO_2$ is pasted with water and reacted with HF.

DETAILED DESCRIPTION OF THE INVENTION

In the present invention $LiBF_4$ is prepared by treating suspended particles of $LiBO_2/Li_2N_2O_4$ in aqueous solution or a paste of $LiBO_2$ in water with HF. The quantity of $LiBO_2$ and HF are calculated for the reaction separately. After the cessation of the reaction the product was concentrated and crystallized. The product formed was examined and confirmed by x-ray and the purity of the sample was examined.

A calculated quantity of HF was carefully added to a known weighed quantity of LiBO2 in aqueous solution. The reaction was allowed to proceed. When the reaction ceased, the product was concentrated and recrystallized to get very high purity of the sample. The product was examined for its purity and identified by x-ray. FIG. 1 indicates the x-ray analysis which matches with available literature (Table 1).

TABLE 1

| 350985 | $LiBF_4$ 2θ | d value | intensity | OBS | | In-tensity | Error |
|---|---|---|---|---|---|---|---|
| 1 | 18.618 | 4.762 | 70 | 18.797 | 4.717 | 36 | 2 |
| 2 | 26.722 | 3.333 | 100 | 26.903 | 3.311 | 87 | 2 |
| 3 | 27.903 | 3.195 | 100 | 28.176 | 3.165 | 100 | 3 |
| 4 | 34.872 | 2.571 | 30 | | | | |
| 5 | 37.565 | 2.392 | 100 | 37.845 | 2.375 | 55 | 3 |
| 6 | 37.938 | 2.370 | 30 | 37.845 | 2.375 | 55 | −1 |
| 7 | 39.623 | 2.273 | 30 | | | | |
| 8 | 44.541 | 2.033 | 100 | 44.732 | 2.024 | 75 | 2 |
| 9 | 48.093 | 1.890 | 10 | | | | |
| 10 | 50.326 | 1.812 | 30 | 50.521 | 1.805 | 17 | 2 |
| 11 | 52.875 | 1.730 | 30 | 52.875 | 1.730 | 12 | 0 |
| 12 | 54.557 | 1.681 | 30 | | | | |
| 13 | 57.960 | 1.590 | 30 | 57.960 | 1.590 | 13 | 0 |
| 14 | 63.693 | 1.460 | 10 | 64.005 | 1.453 | 7 | 3 |
| 15 | 65.153 | 1.431 | 20 | | | | |
| 16 | 68.965 | 1.361 | 10 | | | | |
| 17 | 71.991 | 1.311 | 10 | | | | |
| 18 | 73.968 | 1.280 | 20 | 74.078 | 1.279 | 8 | 1 |
| 19 | 78.227 | 1.221 | 20 | 78.227 | 1.221 | 10 | 0 |

The synthesis of $LiBO_2$ is disclosed in our copending application.

EXAMPLE 1

Preparation of $LiBO_2$ $Li_2CO_3$ (2.96 gm) and $B_2O_3$ (2.8 gm) are mixed with heating up to 600° C. to obtain $LiBO_2$ with yield of more than 98%. The colour of the product was white and it was obtained in single phase. The single electrode potential of $LiBO_2$ with respect to Li in 1M $LiClO_4$ in propylene carbonate was 2.99 V.

EXAMPLE 2

Preparation of $LiBO_2$ $Li_2OH$ (1.68 gm) and $B_2O_3$ (2.8 gm) are mixed with heating up to 600° C. to obtain $LiBO_2$ with yield of more than 98%. The colour of the product was white and it was obtained in single phase. The single electrode potential of $LiBO_2$ with respect to Li in 1M $LiClO_4$ in propylene carbonate was 2.99 V.

The $LiBO_2$ obtained by the processes of both examples 1 and 2 was high and no side reactions occur.

EXAMPLE 3

Preparation of $LiBF_4$ $LiBO_2$ and HF were mixed in a mole ratio of 1:4 by taking HF in water in a Teflon container, keeping the temperature at −4° C., slowly adding $LiBO_2$. When the reaction ceases, the mixture is slowly heated upto dryness at about 100° C. to obtain dry $LiBF_4$ with a yield of about 95%. The colour of the product was white and the product was obtained in single phase. The single electrode potential of $LiBO_4$ with respect to Li in 1M $LiClO_4$ in propylene carbonate was 2.99 V.

EXAMPLE 4

Preparation of $LiBF_4$ $LiBO_2$ and HF were mixed in a mole ratio of 1:4 by taking HF in alcoholic solvent in a Teflon container, keeping the temperature at −4° C., slowly adding $LiBO_2$. When the reaction ceases, the mixture is slowly heated upto dryness at about 100° C. to obtain dry $LiBF_4$ with a yield of about 95%. The colour of the product was white and the product was obtained in single phase. The equivalent conductance of $LiBF_4$ in 1 molar PC at 30° C. was 34.0 $ohm^{-1}\ cm^2\ mole^{-1}$.

In the present invention the following advantages are claimed for the synthesis of $LiBF_4$:

1. No side reactions occur
2. A one step procedure is sufficient to prepare this compound
3. Required quantity of the product can be prepared by reacting the calculated quantity of reactants.
4. The product obtained is of high purity
5. The product yield becomes 100% if the temperature is kept at −4° C.
6. Wetting of $LiBO_2$ prevents evaporation of $BF_4$ formed during the reaction.

We claim:

1. A process for the preparation of $LiBF_4$ comprising reacting $LiBO_2$ with 10 to 48% HF solution in aqueous solution at ambient temperature, concentrating and crystallizing the resulting mixture to obtain high purity $LiBF_4$.

2. A process as claimed in claim 1 wherein $LiBO_2$ is suspended in aqueous media or non-aqueous media and reacted with HF.

3. A process as claimed in claim 1 wherein $LiBO_2$ is pasted with water and reacted with HF.

4. A process as claimed in claim 1 wherein a paste of $LiBO_2$ is added to HF.

* * * * *